United States Patent [19]

Weinberg et al.

[11] Patent Number: 5,009,869
[45] Date of Patent: Apr. 23, 1991

[54] METHODS FOR PURIFICATION OF AIR

[75] Inventors: Norman L. Weinberg, Amherst; John D. Genders, Lancaster; Alfred O. Minklei, Grand Island, all of N.Y.

[73] Assignee: Electrocinerator Technologies, Inc., East Amherst, N.Y.

[21] Appl. No.: 138,441

[22] Filed: Dec. 28, 1987

[51] Int. Cl.$^5$ .................. B01D 47/00; B01J 8/00; C01B 17/16; C01B 31/20

[52] U.S. Cl. .................................. 423/210; 204/72; 204/78; 204/86; 204/93; 204/101; 423/220; 423/224; 423/235; 423/236; 423/238; 423/240; 423/241; 423/242; 423/245.2

[58] Field of Search ............ 423/245 R, 242 R, 235, 423/236, 238, 224, 210, 220, 245.2, 240 R, 241; 204/86, 93, 72, 78, 101

[56] References Cited

U.S. PATENT DOCUMENTS

| | | | |
|---|---|---|---|
| 3,616,339 | 10/1971 | Marzluff | 204/130 |
| 3,725,226 | 4/1973 | Stoner | 204/149 |
| 3,793,171 | 2/1974 | Zabolotny et al. | 204/130 |
| 3,884,776 | 5/1975 | Keidel | 204/73 R |
| 3,911,080 | 10/1975 | Mehl et al. | 423/245 S |
| 3,926,754 | 12/1975 | Lee | 204/152 |
| 3,927,177 | 12/1975 | Okabe et al. | 423/235 |
| 3,943,228 | 3/1976 | Dezael et al. | 423/237 |
| 3,944,401 | 3/1976 | Dörr et al. | 423/522 |
| 3,944,650 | 3/1976 | Hirota et al. | 423/242 A |
| 3,975,246 | 8/1976 | Eibl et al. | 204/151 |
| 4,041,129 | 8/1977 | Foster et al. | 423/234 |
| 4,048,044 | 9/1977 | Eibl et al. | 204/257 |
| 4,082,835 | 4/1978 | Chlanda et al. | 423/522 |
| 4,220,505 | 9/1980 | Deem | 423/220 |
| 4,284,608 | 8/1981 | Pessel | 423/242 R |
| 4,370,306 | 1/1983 | Kirchner et al. | 423/241 |
| 4,422,917 | 12/1983 | Hayfield | 204/196 |
| 4,426,364 | 1/1984 | Cooper | 423/235 |
| 4,462,911 | 7/1984 | Samhaber | 423/235 |
| 4,523,981 | 6/1985 | Ang et al. | 204/72 |
| 4,643,886 | 2/1987 | Chang et al. | 423/226 |
| 4,668,490 | 5/1987 | Van Velzen et al. | 423/242 R |
| 4,684,510 | 8/1987 | Harkins | 423/210 |

FOREIGN PATENT DOCUMENTS

| | | | |
|---|---|---|---|
| 0017796 | 10/1980 | European Pat. Off. | 423/220 |
| 1538901 | 6/1968 | France . | |
| 2486818 | 1/1982 | France | 423/235 |
| 50-139066 | 11/1975 | Japan | 423/235 |
| 51-52369 | 5/1976 | Japan | 423/235 |
| 54-6889 | 1/1979 | Japan | 423/236 |

OTHER PUBLICATIONS

Qi, Zhang and Cussler, E. L., AIChE Journal, (vol. 31, No. 9) 1548–1553, Sep., 1985.

Primary Examiner—Gary P. Straub
Assistant Examiner—Lori F. Cuomo
Attorney, Agent, or Firm—Howard M. Ellis

[57] ABSTRACT

Air contaminated with chemical and biological pollutants is purified by treating chemically and electrochemically in a closed system minimizing the generation of by-products for disposal. Pollutants are treated in a scrubber zone with a scrubber liquid-electrolyte comprising pollutant degrading metal ions or complexed with inert metal ions and degraded either in an electrolyzer zone or in both the scrubber and electrolyzer zones where spent scrubber liquid-electrolyte is regenerated for further cleaning.

9 Claims, 1 Drawing Sheet

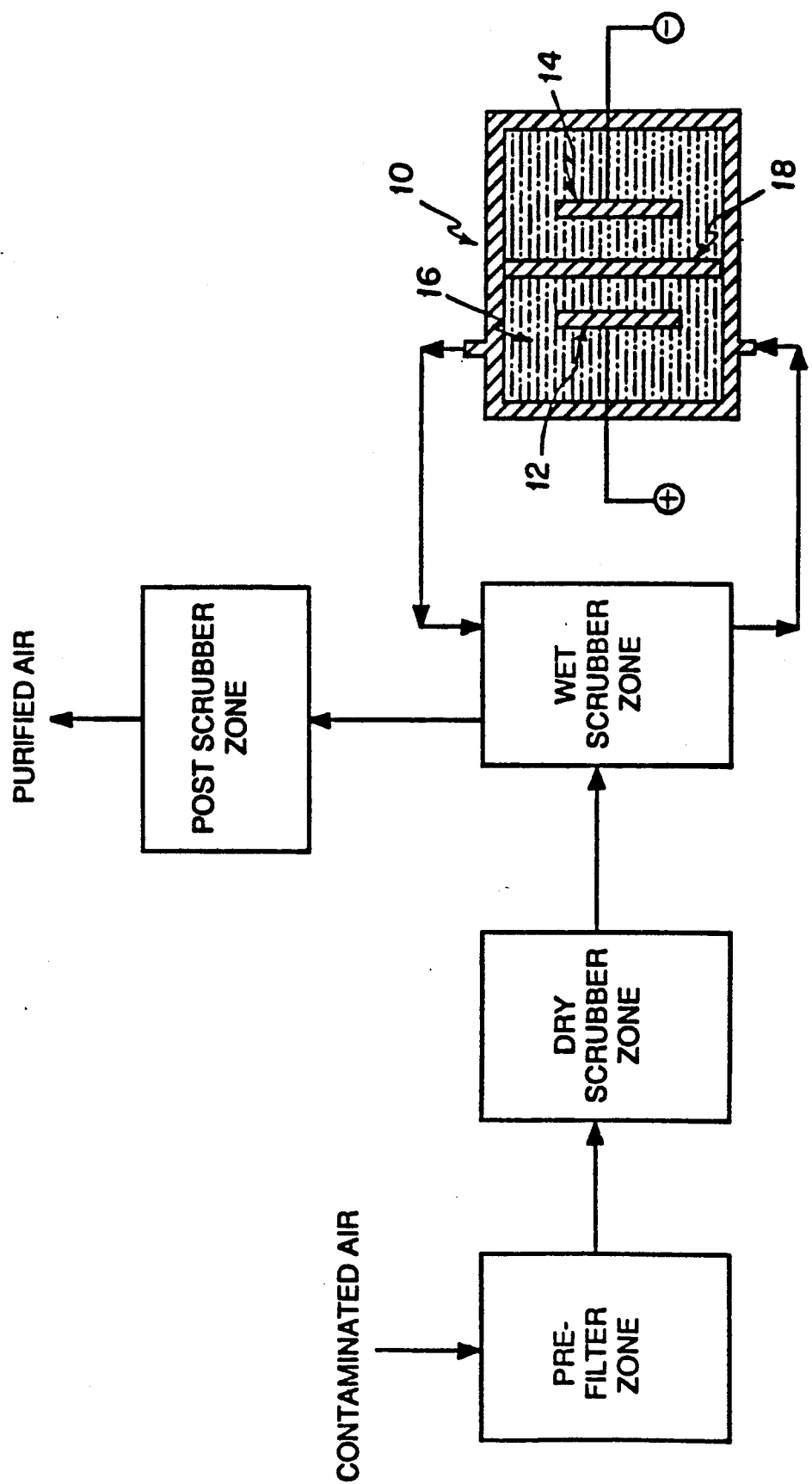

METHODS FOR PURIFICATION OF AIR

This invention was made with government support under contract No. F04704-86-C-0090, awarded by the Department of Defense. The Government has certain rights in this invention.

BACKGROUND OF THE INVENTION

This invention relates generally to improved methods for efficient purification of gases, and more specifically, to methods for both effectively purifying air and simultaneously destroying most potentially harmful airborne chemicals, microorganisms and other biologicals by both chemical and electrochemical means.

Modern society is facing a major problem of increased pollution of the air we breathe in the work environment, homes, hospitals, public buildings and vehicles, caused by a variety of toxic, volatile, and often malodorous and irritating chemicals, as well as potentially dangerous microorganisms, such as viruses, bacteria, molds, yeasts, spores and other pathogens. In the industrial environment, toxic, hazardous, or contaminating chemical vapors, such as formaldehyde, benzene, chloroform, etc., have come under strict government regulation; however, instantaneous worker exposure can be high in case of a spill and often there is little or no provision for rapid removal of such substances from the air to an acceptably low level. Moreover, there often is an accumulation of these airborne pollutants in the vicinity of chemical plants, food processing operations, sewage treatment plants and utilities. Significant or even larger contaminant or pollutant levels can occur indoors because of tightly enclosed, more energy efficient buildings. For hospitals, the continued use of ethylene oxide as a disinfectant has created concern, but an even more immediate dange is the large number of annual mortalities caused by hospital infections. Likewise, air-conditioning units in large buildings have been associated with deadly "Legionnaires Disease".

Kirk-Othmer, 3rd. Edition, Vol. 1, p 653 (Wiley Interscience) lists a variety of methods for removal of pollutants in air, including adsorption, e.g. in activated carbons, absorption in solution, filtration, coagulation, electrostatic precipitation, incineration, chemical reaction, condensation, etc. However, many of these methods cannot readily remove very tiny particles, such as gas molecules and smaller microorganisms.

Absorption of toxic gases by water or aqueous solution, such as HCl, HF, $NH_3$, $Cl_2$, $H_2S$, amines, etc., can be very effective. Likewise, many of these gases, as well as microorganisms, can be removed effectively by adsorption onto solid surfaces, particularly activated carbon. Absorption, adsorption, filtration, coagulation and electrostatic precipitation are physical methods of decontamination. Physical methods are of special interest where recovery of chemicals is desirable economically.

Chemical methods of decontamination include reactions of toxic or hazardous substances with such oxidizing agents as chlorine, chlorine dioxide, hypochlorite, ozone, peroxide or reducing agents such as dithionite, noble metal catalysts and hydrogen, metallic sodium, etc.

Both physical and chemical methods have certain drawbacks however. For example, in situations where it is not desirable to recover airborne chemicals for resuse, the problems of disposal still exists. Also, physical techniques suffer from "saturation" related dangers. For example, in a hospital or "clean-room" situation, carbon-based filters or cartridges can become saturated to the point where no further removal occurs or where dangerous desorption takes place. In contrast, chemical methods often require use of reagents which are themselves quite toxic and often have problems of byproduct disposal. Other methods, such as incineration can be uneconomical or even illegal in certain areas.

In an effort to overcome some of the shortcomings previously noted, electrochemical methods have been tried. For example, U.S. Pat. No. 3,725,226 (Stoner) describes an electrochemical device with graphite electrodes. Pathogens in water are destroyed by periodically reversing DC current. Stoner fails to address the problems associated with air purification, including means for removing harmful substances from air like organic chemicals and their destruction. French Patent No. 1,538,901 (Marzluff et al) teach air purification means capable of destroying a wide range of volatile chemicals, including aldehydes, alcohols, esters and others. Metal oxide anodes, such as lead dioxide and porous air cathodes containing carbon are employed in an electrochemical cell separated by glass wool impregnated with sulfuric acid. Both the Stoner and Marzluff et al patents fail to disclose an effective method for scrubbing toxic airborne substances from air. Moreover, Marzluff et al's electrochemical cell requires the airborne components contact the electrode before destruction of the pollutant can occur placing a severe limitation on mass transport on their apparatus and rate of degradation, especially for contaminants present in air at lower, but still dangerous levels of concentration. Marzluff et al do not utilize a regeneratable electrolyte for further chemical reaction with pollutants.

Methods have also been developed for the removal of toxic and environmentally unacceptable emissions from utilities and from sour gas, usually with the objective of making a useful chemical, instead of forming an essentially innocuous by-product. For instance, U.S. Pat. No. 4,426,364 (Cooper) discloses a process for removing nitrogen oxides and $SO_2$ from gas mixtures including air, by contacting the gas mixture in a scrubber with an aqueous solution of an acid and an oxidizing agent, such as peroxide or persulfate in which nitric and sulfuric acids are formed for recovery. U.S. Pat. No. 4,643,886 (Chang et al) discloses a process for removal of $H_2S$ from sour gas, which is largely methane, comprising contacting the sour gas stream with an aqueous alkaline solution at a temperature below the melting point of the product, namely sulfur. The aqueous solution comprises at least one polyvalent metal chelate in a higher valence state in an effective amount suitable for oxidizing all the $H_2S$ to recoverable sulfur. The inactive form of the polyvalent metal chelate is regenerated anodically in an electrochemical cell, and the solution recycled to the contact zone. The process of Chang et al is conducted under conditions which favor the formation of elemental sulfur for recovery, instead of minimizing or avoiding the production of by-products requiring separation, purification or disposal, or which are consumed by the process, in-situ.

A further representative example of an electrochemically based system is that from Pacific Engineering & Production Co. (Henderson, Nev.) under the trademark, Odormaster. This apparatus, used to eliminate odors in sewage and industrial plants, utilizes an electrochemically generated aqueous sodium hypochlorite solution which circulates through a scrubber. This technology removes the mass transport limitation noted above with the Marzluff et al process, by providing a large reservoir of an oxidizing agent to destroy malodorous components. However, a serious limitation exists in the Pacific Engineering approach in that many kinds of organic compounds, such as olefins and aromatic hydrocarbons will be chlorinated should they enter the electrochemical cell. As a general rule, chlorinated hydrocarbons are more toxic than the parent hydrocarbon, and furthermore, are usually more difficult to destroy by oxidation, as for example, polychlorinated biphenyls.

U.S. Pat. Nos. 3,975,246 and 4,048,044 (Eibl et al) disclose electrochemical means for purifying water contaminated with microorganisms. In the later patent, water is disinfected by an oxidation process at the anode without disinfectant additives. The former patent also relies on anodic disinfection, but also requires chloride, hydroxide, carbonate, etc., in the cathode compartment in concentrations exceeding those in the treated water. Both Eibl et al patents rely principally on electrochemical means for disinfection, and consequently, the scope of contaminants and toxic substances which can be destroyed is limited.

Accordingly, it would be desirable to have an improved method for purifying air and other gases, including means for separating and destroying a broader range of potentially toxic airborne chemicals and microorganisms recovered therefrom, by combining both chemical and electrochemical methods.

SUMMARY OF THE INVENTION

It is, therefore, an object of this invention to provide a method for removing and destroying a much wider range of toxic and hazardous airborne chemicals and biological substances than previous processes, including organics, like unsaturated hydrocarbons, hydrocarbon solvents like benzene, aldehydes like formaldehyde and acrolein, alcohols like methanol and benzyl alcohol, esters like methyl formate and ethyl acetate, amines like ammonia and the alkyl and substituted amines, sulfur compounds like $H_2S$, $SO_2$ and mercaptans, ketones like acetone and 2-butanone, cyanides like hydrogen cyanide and acetonitrile, ethers like diethyl ether and chloromethyl ether, as well as other volatile toxic and hazardous compounds containing functionalities comprising elements like C,H,N,S,P,Cl,Br,I,F,O, organically bound Hg, Cd, Sb, V and the like, as well as mixtures of compounds containing such functionalities. Air may also be contaminated by biological substances, including principally airborne microorganisms like bacteria, viruses, fungi, yeasts, and the like. Producers of such contaminated air include industry, power generating stations, chemical waste handling, disposal and storage sites, hospitals, homes, office buildings, vehicles, breweries, and food processing plants. For purposes of this invention, air and its treatment is intended to mean ambient air, indoors or outdoors for inhalation or respiration in a biological system, and is intended to exclude the direct treatment of process gases and gaseous fuels, e.g. methane. However, the process is intended to treat ambient air which may have become polluted by these sources.

It is a further principal object of the invention to provide for a method of treating air at higher throughput rates than previous methods, including the purification of air having relatively low levels of toxic substances without generating by-products, such as halogenated compounds which can create dangerous health risks.

It is also a principal object of the present invention to provide for a process which minimizes the formation of by-products which cannot be used in the process itself, or which generates bulk quantities of chemical by-products as to present separation, purification or disposal problems.

It is yet an additional object of this invention to provide various means for carrying out the methods herein described, including certain novel devices for practicing the methods.

Generally, methods of this invention provide for the purification of naturally occuring gases, and particularly contaminated ambient air so they are free of virtually all potentially toxic substances, such as hazardous organics and inorganics as well as toxic substances, carcinogens, irritants, etc., making the air biologically safe for inhalation. Thus, methods of the invention provide for scrubbing air prior to inhalation and destruction of toxic or hazardous or potentially toxic or hazardous pollutants separated therefrom comprising the steps of cleaning polluted air in a scrubber zone by sorbing the pollutant from the air with a scrubber liquid-electrolyte which comprises an "electrochemically regeneratable degradant" in an active state. Generally, the pollutant and/or toxic or hazardous substance or contaminant is dissolved or sorbed into the scrubber liquid-electrolyte and may be chemically solvolysed, degraded, oxidized, destroyed or otherwise modified to substances of lesser toxicity or hazard, e.g. carbon dioxide and water. The scrubber liquid-electrolyte is then reactivated in an electrolyzer zone which also provides an important back-up system for degrading any residual pollutant remaining which was not destroyed during the initial chemical phase. The reactivated scrubber liquid-electrolyte can then be returned to the scrubber zone for further cleaning of polluted air. As an alternative embodiment, in those instances where the pollutant or contaminant is poorly reactive with the scrubber liquid-electrolyte in the chemical phase, the present invention contemplates initiating degradation in the electrochemical phase of the process in the electrolyzer zone at the anode.

For purposes of this invention, the expression "electrochemically regeneratable degradant" is intended to mean ions which are capable of forming complexes or reacting with the recovered pollutants. This would include, for example, redox couples, either metal or nonmetal ions, which in a higher valence state, i.e. oxidizing or active state, degrade, react or otherwise chemically decompose the pollutant. Electrochemically regeneratable degradant—is also intended to include other complexing ions, particularly metal ions which may not have a higher valence or oxidizing state under the process conditions, but form soluble complexes with the pollutant so it can be more readily degraded in the electrolyzer zone.

During the chemical phase of the process the active higher valence ions more generally degrade/destroy pollutant(s) and become reduced to a lower valence, i.e. transformed into an inactive state. The inactivated scrubber liquid-electrolyte then enters the electrochemical phase of the process where any residual untreated pollutant still remaining in the electrolyte is degraded, oxidized or otherwise destroyed in the electrolyzer zone while the lower valence ions, for example, of the redox couples are simultaneously regenerated by oxidizing at the anode back to their higher valence or active state. Similarly, complexing metal ions lacking higher oxidation states under process conditions which form soluble complexes with pollutants, hereinafter also referred to as the—inactive state—, in the scrubber zone are degraded in the electrolyzer zone which also "releases" uncomplexed metal ion, or in other words, transforms them back to their "active state" for further use in the scrubber zone.

Accordingly, the present invention comprises a "closed system" which is intended to mean that it is a continuous recycling chemical and electrochemical process which degrades or destroys recovered toxic and hazardous substances without generating any "useful" by-products for removal and use outside the system, e.g. sulfur, sulfuric acid, nitric acid. Thus, a "closed system" means the methods contemplated herein are intended for implementation under conditions which minimize generation of residual by-products which can present troublesome separation, purification or disposal problems. More preferably, any by-products generated during the chemical and electrochemical phases of degrading recovered toxic or hazardous substances are used or consumed in-situ directly in the process.

The "closed system" concept is also intended to mean that electrochemically regeneratable degradant for destruction of contaminants, is essentially not irreversibly consumed in the process, but instead, is regenerated and recycled for further use in the chemical phase. However, this is not intended to mean that make-up quantities of degradant and other electrolyte components, e.g., salts, employed in the scrubber liquid or incidental salts and other solids which may form in the system after a period of operation will not have to be added or removed from the system time-to-time.

As a further alternative embodiment this invention contemplates processes which may optionally include pretreatment of contaminated gases before cleaning in the scrubber zone. They include treating the contaminated air in a prefilter zone for removing macroparticles like dust and flyash. A further optional pretreatment step includes a prescrubber zone for adsorbing larger instantaneous releases of toxic, hazardous or contaminating substances, particularly those exhibiting low water solubility. A still further option is a post treatment zone for fresh water-rinsing of the air leaving the electrolyzer zone, as well as reducing moisture content as final treatment steps before discharging the purified air or gas.

These and other objects, features and advantages of the invention will become more apparent from the detailed written description below. However, for a further understanding of the invention, reference is first made to the accompanying drawing which provides a schematic view of the purification processes.

DESCRIPTION OF THE DRAWING

The drawing provides a block diagram of a preferred embodiment of the invention.

DETAILED DESCRIPTION OF THE INVENTION

In all embodiments of the invention, contaminated air is treated in a wet scrubber zone to clean and separate virtually all chemical and biological pollutants from incoming air. The wet scrubber zone may comprise an efficient wet scrubber containing, for example, a high surface area packing which is inert to the circulating aqueous scrubber liquid-electrolyte described in greater detail hereinbelow. The wet scrubber can be separate from the electrochemical reactor or may be integral with it. Such scrubbers, as separate units, can be of the usual designs, available commercially in many configurations and sizes, for effectively contacting the contaminated air and for removing or dissolving toxic substances into the aqueous scrubber liquid-electrolyte. It has been found that a particularly useful scrubber design for the purposes of this invention is provided by bundles of microporous hollow fibers (not shown) of the type manufactured by a number of companies including Celanese Separation Products of Charlotte, N.C., the Raipore Division of RAI Research Corporation, Hauppauge, N.Y. and by Nitto Denko in Japan. These hollow fiber bundles are manufactured of inert polymers, such as polysulfone and polypropylene, and are selected with pore diameters sufficiently large for decontamination of airborne chemicals and pathogens, but not too large such that the aqueous electrolyte circulating on the outside of the hollow fibers, penetrates to the interior of the hollow fibers and is thus swept away.

The scrubber function may also be an integral part of the electrochemical cell design, particularly where one of the electrodes of the cell, 10 is porous, such as for example, a gas diffusion electrode or air cathode design as constructed for use in fuel cells and metal/air batteries. Here, the gas diffusion electrode serves both as the electrode and an effective wet scrubber when contaminated air is contacted with the non-wetted side of such electrodes. Another integrally located wet scrubber configuration comprises inert microporous hollow fiber bundles or an inert packing situated between anode 12 and cathode 14 of electrochemical cell 10 located in aqueous electrolyte 16 in a compartmented cell as illustrated with a separator 18, or uncompartmented cell in the absence of such separator where the contaminated air passes through the inert microporous hollow fiber bundles or bubbled through the inert packing in the aqueous electrolyte. These integral air purifier designs are especially useful where smaller, more compact air purification units are desired, as for example, in portable gas masks and completely enclosed environmental suits.

As illustrated, scrubber liquid-electrolyte 16 in a nonintegral system may be circulated in a loop forming a—closed system—from the anode compartment of cell 10 to the wet scrubber zone where the polluted air is cleaned and chemical and biological contaminants dissolved into the liquid, may be further broken down to products of substantially lesser toxicity or hazard, like carbon dioxide and water. The scrubber liquid-electrolyte provides an effective solubilizing and/or chemically reactive solution or reagent for efficient removal of contaminants from the gaseous phase. Further, the scrubber liquid-electrolyte serves as an efficient reservoir for collection of both unreacted, but more often at least partially reacted contaminants, which are continually degraded or destroyed in the electrolyzer zone to form substances of lesser toxicity or hazard. Where chemical reaction of the active state of the degradant with the contaminant has occured, the "inactive" state of the degradant is generated, but this "inactive" state is reconverted to the active form at the anode in the electrolyzer zone.

The scrubber liquid-electrolyte comprises as a principal component at least one—electrochemically regeneratable degradant—which can be, for example, a redox couple. Suitable electrochemically regeneratable redox degradants may include any of the known redox couples based on chromium, cerium, vanadium, cobalt, manganese, iron, nickel, silver, etc. and which when in their "active" form i.e. higher valence or higher oxidation state are capable of chemically degrading, destroying and/or disinfecting the pollutant-containing scrubber liquid-electrolyte without generating meaningful amounts of by-products for recovery and use outside the system. Such redox couples must also be capable of being reoxidized to their active form after undergoing reduction by chemical reaction with a contaminant. Suitable redox couples are also intended to include the halogens like chlorine, bromine and iodine, but under conditions and in amounts which are sufficient to disinfect or destroy the chemical or biological pollutants, but without forming potentially more toxic halogenated by-products, e.g. chlorinated hydrocarbons in the process. Accordingly, the expression "electrochemically regeneratable degradant" for purposes of this invention is intended to exclude redox couples which tend to halogenate, e.g. $Cl_2/Cl^-$, $HOCl/Cl^-$ and the like.

Bard et al in "Standard Potentials In Aqueous Solution" (Marcel Dekker, 1985) list a substantial number of preferred redox couples of sufficiently high oxidation potential which we have found enable destruction of many kinds of contaminants in air. These redox couples include the following specific examples: $Co^{+3}/Co^{+2}$; $Cr_2O_7^{-2}/Cr^{+3}$; $Ce^{+4}/Ce^{+3}$; $Fe(CN)_6^{-3}/Fe(CN)_6^{-4}$; $Fe^{+3}/Fe^{+2}$; $Mn^{+3}/Mn^{+2}$; $Pb^{+4}/Pb^{+2}$; $VO_2^+/VO^{+2}$; $MnO_4^-/MnO_2$; $Ag^{+2}/Ag^+$; $S_2O_8^{-2}/SO_4^{-2}$; $Br_2/Br^-$ etc.

As part of this invention, it has also been discovered that combinations of more than one redox couple (e.g. $Cr^{+6}/Cr^{+3}$ with $Ce^{+4}/Ce^{+3}$) significantly enhance, by potentiating, the rate of destruction of toxic substances, perhaps because different oxidation pathways are called for depending upon the nature of the chemical substance. Suitable electrochemically regeneratable degradants also include any of the known metal complexing ions which are capable of complexing, solubilizing, and hence removing pollutants from air for destruction principally in the electrolyzer zone. These include metal ions based on copper, nickel, cobalt, silver, palladium, etc., and which are capable of forming soluble complexes with a variety of organics like alcohols, amines, sulfides, carbon monoxide and others. Such complexed and hence inactivated metal ion degradants must also be capable of regeneration to their active, uncomplexed form during the electrochemical phase. That is to say, instead of or in addition to the foregoing redox couples, soluble inert metal ions such as $Co^{+2}$, $Cu^{+2}$, $Ni^{+2}$, $Ag^+$, $Pd^{+2}$, etc. may be added to the scrubber liquid-electrolyte solution to aid in solubilization of specific kinds of toxic substances which are readily complexed. For example, $Cu^{2+}$ has excellent complexing properties for ammonia and amines, thereby greatly assisting solubilization of these pollutants for destruction in the electrolyzer zone. Likewise, $Cu^{+2}$ is capable of performing effectively in the presence of $Cr^{+6}$ of the $Cr^{+6}/Cr^{+3}$ redox couple. Other metal complexing ions are also useful in the methods of this invention for their catalytic effect, e.g. $Ag^+$ in combination with chrome redox couple is also useful in promoting the regeneration of $Cr^{+6}$. Another example is complexation of cyanide by iron or silver. While chemical degradation may not occur in some of these cases in the electrolyte solutions, these contaminants are irreversibly removed or eventually degraded by oxidation at the anode with regeneration of the metal ion.

To be most effective, redox couples and metal ion complexing salts are used in aqueous media of appropriate pH, in presence of suitable anions and cations such that the rates of solubilization or reaction with the contaminant as well as regeneration of the oxidized active form of the redox couple at the anode are maximized. For example, redox couples based upon chromium, cerium and vanadium are most active, stable and readily regeneratable at acidic pH's, whereas permanganate is best generated and employed in alkaline medium. Anions such as sulfate, phosphate and nitrate, as well as cations, such as protons and alkali metal ions like $Na^+$, $K^+$, $Li^+$ are stable to the process conditions. In contrast, anions such as organic carboxylates, like formate or acetate, and cations like ammonium or alkylammonium may be unstable and may tend to degrade. Likewise, organic complexing agents such as EDTA and the like are considered undesirable for use in this invention in general because of their instability to oxidation at the anode. Those skilled in the art can readily discern the appropriate stabilizing conditions for a given redox couple. The preferred concentration of soluble regeneratable redox couples and complexing agents is in the range of about 0.0001M to the limit of solubility. The operating temperature of the aqueous electrolyte solution is largely dictated by the temperature of air requiring purification; however, heating of the aqueous electrolyte above ambient temperatures can be readily achieved, if needed, by employing a suitable heater in the air purification system. Likewise, cooling of the aqueous electrolyte may be required in instances where the contaminated air is a hot air stream.

In addition to one or more redox couples and inorganic complexing agents the aqueous scrubber liquid-electrolyte should have sufficient ionic constituents to provide for ionic conductivity in the electrochemical cell. The ionic conductivity may be adequately supplied by the redox couple or complexing agent ions, or the conductivity may be enhanced by addition of compatible electrolytes, such as $H_2SO_4$, $Na_2SO_4$, $NaHSO_4$, $NaH_2PO_4$, $HClO_4$, $NaClO_4$, $HNO_3$, $HBF_4$, $NaBF_4$, as well as others. Here, the choice of the electrolyte is largely dictated by such factors as the desired electrolyte solution pH; stability and reactivity of the redox couples; stability and electrocatalytic activity of the electrodes. In addition to the above constituents, the aqueous electrolyte may contain other ionic constituents such as silver ion and bromide ion which help to catalyze electrochemical regeneration of some redox couples and increase the rate of degradation of some contaminants respectively. Halide ions such as chloride, bromide and iodide may be present, but only at low non-halogenating concentrations. Quaternary ammonium ion salts ($R_4NX$), in addition, can be used to increase the solubility of the more non-polar type contaminants like hydrocarbons. The concentrations of these additional additives is preferably not greater than the concentration of the redox couple or complexing agent ions and is usually about 1 to 1/100 that of the redox couple on a molar basis. The types of quaternary ammonium ion salts useful in this invention are the oxidation-inert, lower saturated aliphatic types i.e. alkyl where R is in the range of 1 to 6 carbons. Examples of suitable $R_4NX$ salts include $(CH_3)_4NBr$, $(CH_3)(C_2H_5)_3NClO_4$, $(C_4H_9)_4NBF_4$, $(C_6H_{11})_4NClO_4$, and $(C_3H_7)_4NHSO_4$.

As before mentioned, the electrochemical reactor of the air purification apparatus comprises an anode, a cathode, and an aqueous electrolyte. In addition, an inert separator or ion-exchange membrane may be required in the cell to minimize conversion at the cathode, of the active form of the redox couple to the inactive form. To power the electrochemical cell, a suitable DC power supply or pulsed power supply may be used which may comprise batteries for smaller portable applications such as gas masks and environmental suits, or even fuel cells for larger applications, where portability is still important. Suitable anode materials comprise inert electronically conductive materials such as Pt, $PbO_2$ on Pb, graphite or Ti, $RuO_2$ on Ti, Pt/Ir on Ti, $IrO_2$ on Ti, AgO on Ag, nickel (III) oxide on Ni, Au, $Ti_4O_7$ (Ebonex ®), $PbO_2$ on $Ti_4O_7$, graphite, vitreous carbon and especially at high pH's, steel or nickel and various alloys thereof. The choice of the appropriate anode material is made by considering such factors as stability of the anode material in the aqueous scrubber liquid-electrolyte solution and its electrocatalytic properties for achieving high efficiencies in conversion of redox couples to the active forms, as well as in degrading residual and persistent contaminants in the aqueous electrolyte solution. In contrast, the choice of cathode material is broader and includes metals, such as lead, silver, steel, nickel, copper, platinum, zinc, tin, etc. as well as carbon, graphite, $Ti_4O_7$ and gas diffusion electrodes as described above. The electrode material, whether anode and/or cathode may be of either low or high surface area. Higher surface area electrodes, such as for example metal or graphite beads, carbon felt, or reticulated vitreous carbon are especially useful in achieving higher efficiencies for electrochemical conversion of redox couples or destruction of toxic or hazardous substances when these are present at low concentration in the aqueous electrolyte.

The electrochemical cells of the present invention may be monopolar or bipolar in design and may include designs such as packed bed, fluidized bed, capillary gap and zero gap, depending largely on the application for which the air purification apparatus is intended. For many applications, these cells may contain a suitable inert microporous separator or ion-exchange membrane, separating anode and cathode compartments, thereby preventing the active form of the redox couple from being reduced at the cathode. A broad range of inert materials are commercially available based on microporous thin films of polyethylene, polypropylene, polyvinylidenedifluoride, polyvinylchloride, polytetrafluoroethylene and the like, as well as anionic and cationic type membranes manufactured by such companies as RAI under the trademark of Raipore, by DuPont under the trademark of Nafion, as well as by Toyo Soda and others. Alternatively, the cells, in some instances, may be operated successfully in an undivided or non-compartmented configuration, in these cases wherein the active form of the redox couple is not efficiently inactivated at the cathode because of more favorable cathode reactions occuring, such as hydrogen evolution or oxygen reduction. Operation in an undivided, non-compartmented mode is particularly appropriate for degradation of the more unreactive halocarbon type contaminants such as chloroform, trichloroethylene, polychlorinated biphenyls, dioxin and the like, since degradation will largely occur at the cathode by reductive dehalogenation. Non-compartmented cell design is also appropriate when the cell comprises an air depolarized cathode and contaminated air is contacted with the non-wetted side of such porous cathodes. In this instance the cathode itself becomes the wet scrubber described previously.

The scrubber system may optionally comprise a "dry" prefilter zone consisting of a woven or porous material of the kind employed in conventional heating, air-conditioning and air-handling systems for physical removal of large airborne particles, such as flyash, carbon black, pollen, asbestos and the like. Such a prefilter is especially important when employing hollow fiber-type scrubbers to prevent blockages of the hollow fiber air inlet openings. As a further option the scrubber system may include a "dry" prescrubber zone located between the optional prefilter and wet scrubber zones. The dry scrubber zone is useful in reversibly adsorbing larger releases of airborne toxic or hazardous substances and for slowly releasing these to the wet scrubber for decontamination. Generally, all toxic substances have sufficient solubility in the aqueous electrolyte at the relatively low levels in which they may be present in air (often less than 1000 ppm); however, some substances have very low solubility in aqueous media. Therefore, the dry scrubber is particularly useful for low solubility substances such as nonpolar hydrocarbons and halocarbons. Suitable packings for the dry scrubber zone comprise various kinds of activated carbons as well as polymer beads, especially microporous polymer beads of such polymers as divinylbenzene styrene copolymer, polyvinylbenzene, polystyrene, and polyvinylchloride.

Since the purified air emerging from the wet scrubber may be of high humidity and have traces of aqueous electrolyte, the scrubber system also provides for an optional "post" scrubber zone, which may include a final wash with water, a demister to remove aerosol-type water particles and/or a dehumidifer to lower the humidity of the exiting purified air.

In addition to gas masks and environmental suits previously described, the air purification systems of this invention, both integral and nonintegral, are readily adaptable to heating and cooling systems of residential and nonresidential buildings. For instance, air circulation ducts of a forced air heating system of a hospital or other large building can be equipped with such an air purifier, so that heated air returning to rooms will be free of pollutants. Individual room humidifiers for the house for adding moisture to the air can also be equipped with the air treatment systems of this invention. Such air purification systems can also be integrated into forced air heating and cooling systems for homes, factories, office buildings, schools and the like.

The following specific examples demonstrate the various aspects of this invention, however, it is to be understood that these examples are for illustrative purposes only and do not purport to be wholly definitive as to conditions and scope.

EXAMPLE 1

An air purifying apparatus was assembled using a commercially available plate-and-frame electrochemical cell, the MP Cell, manufactured by ElectroCell AB of Sweden. The cell consisted of a lead dioxide anode (0.01 $m^2$ in area), DuPont Nafion ® 324 cation exchange membrane, and a lead cathode. The cell was connected to a DC power supply which also had attached an ammeter, voltmeter and coulometer for following the charge passed. The aqueous electrolyte of the anolyte consisted of 3 liter of 0.1M chromic acid dissolved in 3M sulfuric acid in water, and the catholyte, 3 liter of 3M aqueous sulfuric acid. The anolyte was continuously circulated by means of a March Pump (Model TE-MDX-MT-3) to the scrubber, while the catholyte was likewise continuously circulated to a reservoir. Two all-plastic flow meters were situated in these separate electrolyte streams, and by means of valves, the flow rate on each stream was adjusted to be approximately equal and about 4 liter/min. The scrubber consisted of a 3 liter cylindrical tower constructed of glass, which was partially filled with glass beads to provide a high surface contact area, and which was fitted with a thermometer and a potentiometric measurement device for monitoring the dichromate solution level. This latter device comprised a Pt wire electrode, saturated calomel reference electrode and a high impedance digital multimeter, with the two electrodes immersed in the circulating solution. The scrubber also had provisions for introducing a contaminated air stream and for taking samples for analysis of the purified air.

This air purifying apparatus was operated for the destruction of a test contaminant sample, which when totally dissolved in the anolyte contained 0.03M benzyl alcohol and 0.05M ethylene glycol. A DC current of 2 to 2.5A was allowed to pass through the cell, and after a total of 23,400 coulombs had been passed, it was determined by gas chromatographic analysis that none of these contaminants remained in solution. The charge required to regenerate the active $Cr^{+6}$ redox agent from the inactive $Cr^{+3}$ form was 166,600 coulombs indicating that the system had converted the contaminants to lower molecular weight products, including $CO_2$. In a comparison control experiment, in which the anolyte contained no redox couple, requiring destruction to occur by anodic oxidation alone, a total of 46,000 coulombs was required for destruction of these contaminants, compared to 23,400 coulombs with the redox couple present. This demonstrates the greater effectiveness of an air purification process which combines scrubbing with electrolyzing using an aqueous scrubber liquid-electrolyte containing a redox couple degradant.

EXAMPLE 2

The wet scrubber of Example 1 was replaced with a polymer tube packed with bundles of microporus hollow fibers, manufactured of polypropylene and constructed such that contaminated air could be passed through the interior of the hollow fibers, while the aqueous anolyte was continuously pumped over the exterior of these fibers. The air flow was typically about 600 ml/min. and contained from 40 to 400 ppm of contaminant. Using the method of Example 1, the destructive removal from air of the following contaminants was demonstrated, (the percentage of contaminant removed from air in one pass is noted in parenthesis): formaldehyde (85%); ethylene oxide (100%); sulfur dioxide (100%); nitrogen dioxide (88%).

EXAMPLE 3

The electrochemical cell of Example 1 is fitted with a $PbO_2$ on Ti anode and a carbon-based gas diffusion electrode, consisting of Vulcan XC-72 carbon and Teflon ® fibers, as manufactured by Prototech Co (Newton, MA.), as Model No. PCC. No membrane or separator is employed in this cell. An air stream contaminated with hydrogen sulfide is caused to pass over the non-wetted side of the gas diffusion electrode, while a solution of ferric sulfate in aqueous sulfuric acid is circulated by means of a pump through the cell. The exiting air is purified as current flows through the electrochemical cell, thereby demonstrating the wet scrubber as an integral part of the electrochemical reactor.

EXAMPLE 4

The air purifying apparatus of Example 1 is fitted with a dry scrubber tower, such that contaminated air containing a nonpolar aromatic hydrocarbon is caused to pass first through the dry scrubber and then into the wet scrubber of the scrubber system. The dry scrubber packing consists of activated carbon, activated carbon mixed with microporous polymer beads of divinyl benzene styrene copolymer, or the copolymer beads alone. Operation of the air purification system, with passage of current demonstrated destructive removal of the contaminant.

EXAMPLE 5

Part A

A portable electrochemically-based air purifier is assembled into a gas mask, capable of removal and destruction of a board spectrum of toxic chemical and pathogenic substances. A conventional gas mask powered by a portable battery pack and equipped with an electrical circulating system, is modified by incorporation into the air intake portion a dry scrubber element comprising activated carbon through which the air is initially drawn, followed by a wet scrubber unit incorporating microporous hollow fibers through which an aqueous electrolyte is circulated from a small electrochemical cell powered by the above-mentioned battery pack. The circulating aqueous electrolyte consists of an acid solution as anolyte containing the couples $Cr^{+6}/Cr^{+3}$, with $Ce^{+4}/Ce^{+3}$ and additives of $Cu^{2+}$ as a complexing agent degradant and $Ag^{+}$ as a catalyst. The electrochemical cell comprises a $PbO_2$ on Pb anode, a DuPont Nafion ® membrane, and an air-depolarized gas diffusion cathode in contact with a non-circulating reservoir of an aqueous electrolyte solution as catholyte. Current inefficiencies will lead to oxygen evolution by electrolysis of water. However, this is desirable especially when used with a gas mask, in which the oxygen can be utilized as a source of supplemental life supporting oxygen for inhalation.

Part B

The effective destruction of microorganisms in the aqueous electrolyte is demonstrated for Echovirus, Adenovirus, Rhinovirus, Influenza virus, *Legionella Pneumophila, Staphylococcus Aureus, Streptococcus Pyogenes*, and *Streptococcus Phenumoniae*. Total kill is observed by contacting the microorganisms with aqueous 3M $H_2SO_4$ containing 0.1M $CrO_3$ in the gas mask of Part A.

EXAMPLE 6

Oxidation of several organic substances by either excess $Cr^{+6}$ or $Ce^{+4}$ degradant solutions alone were found to be very slow or not to occur at all at ambient temperatures, even after 5 to 7 days. For example, dimethylsulfone was found to be unreactive to either of these degradants alone; however, the combination of degradants oxidized dimethylsulfone to the extent of 11% toward total conversion to $CO_2$. Likewise acetone with excess $Cr^{+6}$ could only be taken to 3% of conversion and with excess $Ce^{+4}$ to 21%; however, acetone with a combination of excess degradants oxidized acetone to the extent of 43% toward total conversion to $CO_2$. The above results were determined by comparing the number of equivalents of degradants consumed after the reaction time, titrimetrically, with the theoretical number of equivalents required to achieve complete oxidation toward $CO_2$. These experiments demonstrate that a combination of degradants can be more effective both in the rate and on the extent of oxidation.

EXAMPLE 7

An aqueous scrubber solution comprising cupric salt is employed to scrub air contaminated with ethylenediamine. The solubilized and complexed pollutant-containing solution is oxidized at a $PbO_2$ anode using the cell of Example 1, causing destruction of the pollutant at the anode and regeneration of the degradant to its active uncomplexed state, for further use in the chemical phase.

While the invention has been described in conjunction with specific examples thereof, this is illustrative only. Accordingly, many alternatives, modifications and variations will be apparent to persons skilled in the art in light of the foregoing description, and it is, therefore, intended to embrace all such alternatives and modification as to fall within the spirit and braod scope of the appended claims.

We claim:

1. A method for purification of air and destruction of pollutants therein, which comprises the steps of cleaning polluted air in a scrubber zone by sorbing the pollutants with a scrubber liquid comprising an electrochemically regeneratable degradant comprising pollutant destruction rate potentiating combinations of redox couples selected from the group consisting of $Cr^{+6}/Cr^{+3}$ and $Ce^{+4}/Ce^{+3}$; $Cr^{+6}/Cr^{+3}$ and $Br_2/Br^-$; $Ce^{+4}/Ce^{+3}$ and $Br_2/Br^-$; and $Cr^{+6}/Cr^{+3}$, $Ce^{+4}/Ce^{+3}$ and $Br_2/Br^-$; converting the pollutants in said scrubber liquid to a substance of lesser toxicity or hazard; reactivating the spent degradant combination in said scrubber liquid to an active state while also degrading any residual pollutant by oxidizing in an electrolyzer zone, and returning said reactivated scrubber liquid to said scrubber zone for further cleaning of polluted air.

2. The method of claim 1 wherein said scrubber zone and electrolyzer zone are integral with each other.

3. The method of claim 1 including the step of filtering the polluted air before cleaning in the scrubber zone.

4. The method of claim 1 including the step of cleaning the polluted air in a prescrubber zone before cleaning in said scrubber zone.

5. The method of claim 1 including the step of recovering moisture from the purified air in a post scrubber zone after cleaning in said scrubber zone.

6. The method of claim 1 wherein the scrubber zone is comprised of bundles of microporous hollow fibers.

7. The method of claim 1 wherein the electrolyzer zone comprises an electrochemical cell having an anode and a cathode wherein said anode comprises $Ti_4O_7$.

8. The method of claim 1 wherein the electrolyzer zone comprises an undivided electrochemical cell having an anode and a cathode wherein said cathode comprises $Ti_4O_7$.

9. A method for purification of air and destruction of pollutants therein, which comprises the steps of cleaning polluted air in a scrubber zone by sorbing the pollutants with a scrubber liquid comprising a $Cr^{+6}/Cr^{+3}$ redox couple in combination with a $Ce^{+4}/Ce^{+3}$ redox couple, said combination being suitable for enhancing dissolution and destruction of susceptible pollutants when said combination is in an active state; converting the pollutants in said scrubber liquid to a substance of lesser toxicity or hazard; reactivating the spent redox couples in said scrubber liquid to an active state while also degrading any residual pollutant by oxidizing in an electrolyzer zone, and returning said reactivated scrubber liquid to said scrubber zone for further cleaning of polluted air.

* * * * *